United States Patent
Ahmed et al.

(10) Patent No.: US 12,381,805 B2
(45) Date of Patent: Aug. 5, 2025

(54) METHOD TO SELECT BEST PATH FOR SaaS USING APPLICATION AND NETWORK TELEMETRY

(71) Applicant: Cisco Technology, Inc., San Jose, CA (US)

(72) Inventors: Syed Arslan Ahmed, Karnataka (IN); Rahul Ramachandran, Dublin, CA (US); Jegan Kumar Somi Ramasamy Subramanian, Mountain View, CA (US); Nagarajan Venkatesan, Mill Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/989,414

(22) Filed: Nov. 17, 2022

(65) Prior Publication Data
US 2024/0064085 A1    Feb. 22, 2024

(30) Foreign Application Priority Data
Aug. 16, 2022 (IN) .............................. 202241046427

(51) Int. Cl.
*H04L 43/12* (2022.01)
*H04L 45/12* (2022.01)

(52) U.S. Cl.
CPC ............ *H04L 43/12* (2013.01); *H04L 45/124* (2013.01)

(58) Field of Classification Search
CPC . H04L 45/124; H04L 45/123; H04L 41/5009; H04L 45/125; H04L 43/12; H04L 12/2854
See application file for complete search history.

(56) References Cited

U.S. PATENT DOCUMENTS

| | | | | |
|---|---|---|---|---|
| 7,245,915 | B2* | 7/2007 | Matta ..................... | H04W 36/26 455/437 |
| 8,537,840 | B1* | 9/2013 | Raszuk .................... | H04L 45/12 396/389 |
| 9,736,056 | B2* | 8/2017 | Vasseur .................. | H04L 45/121 |
| 10,097,449 | B2* | 10/2018 | Patel ....................... | H04L 67/10 |
| 10,116,524 | B2* | 10/2018 | Jensen ................ | H04L 43/0829 |
| 10,320,655 | B1* | 6/2019 | Asveren ................ | H04L 45/306 |
| 10,972,387 | B2* | 4/2021 | Iyer ........................ | H04L 43/08 |
| 10,992,654 | B2* | 4/2021 | Raza ................... | H04L 63/0471 |
| 11,153,196 | B2* | 10/2021 | Sanchez Charles .... | H04L 45/08 |

(Continued)

*Primary Examiner* — Alex H. Tran
(74) *Attorney, Agent, or Firm* — Lee & Hayes, P.C.

(57) ABSTRACT

Techniques are provided herein for determining a routing path for application traffic based on historic application telemetry and current network telemetry. The techniques comprising determining current metrics for a set of potential paths between an edge device and an application endpoint associated with an application, generating, from the current metrics, a link score for individual paths in the set of potential paths, receiving application status data generated from historic telemetry data associated with the application and the set of potential paths, generating, from the application status data, an application score for individual paths in the set of potential paths, and determining, as a function of the link score and the application score for individual paths in the set of potential paths, a selected path to be used in communications between the edge device and the application endpoint.

19 Claims, 11 Drawing Sheets

(56) References Cited

U.S. PATENT DOCUMENTS

| | | | |
|---|---|---|---|
| 11,546,239 B2* | 1/2023 | Bajaj | .................... H04L 45/123 |
| 2018/0375744 A1* | 12/2018 | Mayya | .................... H04L 45/70 |
| 2020/0382429 A1* | 12/2020 | Bajaj | .................. H04L 41/5009 |
| 2021/0367832 A1 | 11/2021 | Ramachandran et al. | |
| 2022/0052927 A1 | 2/2022 | Yelahanka Raghuprasad et al. | |
| 2022/0116315 A1* | 4/2022 | Zhang | .................... H04L 43/12 |
| 2022/0191143 A1 | 6/2022 | Vasseur et al. | |
| 2022/0217049 A1 | 7/2022 | Vohra et al. | |
| 2023/0028872 A1* | 1/2023 | Ramaswamy | ........ H04L 45/123 |

* cited by examiner

METHOD TO SELECT BEST PATH FOR SaaS USING APPLICATION AND NETWORK TELEMETRY

CROSS REFERENCE TO RELATED APPLICATIONS

This application claims priority to Indian Provisional Patent Application No. 202241046427, filed Aug. 16, 2022, the entire contents of which are incorporated herein by reference.

TECHNICAL FIELD

The present disclosure relates generally to computer networks, and more particularly, to proactive routing using dynamic weighting of application and network telemetry.

BACKGROUND

Software-defined wide area networks (SD-WANs) represent the application of software-defined networking (SDN) principles to WAN connections, such as connections using cellular networks, the Internet, and Multiprotocol Label Switching (MPLS) networks. The power of SD-WAN is the ability to provide consistent service level agreement (SLA) for important application traffic transparently across various underlying paths of varying transport quality and allow for seamless path selection based on path performance characteristics that can match application SLAs.

With the emergence of technologies such as Infrastructure as a Service (IaaS) and Software as a Service (SaaS), the resulting virtualization of services has led to a dramatic shift in the traffic loads of many large enterprises. Indeed, many SaaS services can now be reached in a typical deployment via a number of different network paths. However, path selection can also greatly impact the quality of experience (QoE) associated with a given SaaS application. For instance, delays, losses, or jitter along the routing path can lower the QoE of the SaaS application. However, the use of multiple paths can lead to a strong variation of SLA and QoE.

Today, many path routing decisions are made based on network key performance indicators (KPIs) such as a loss and latency for the network. However, path routing decisions made based on such KPIs alone may be inadequate. For example, while TCP probes may be used to determine KPI values of paths within a network, such KPI values may not accurately reflect the status of the network, and particularly the relationship between the network and applications. For example, TCP probes are destined to ping end points rather than actual applications, such that best path decisions are only based on KPIs of the network up to the end point. Additionally, TCP probes may be subject to different treatment on the network than actual application traffic. Hence, KPI values obtained using TCP probes may not accurately reflect those of application traffic.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
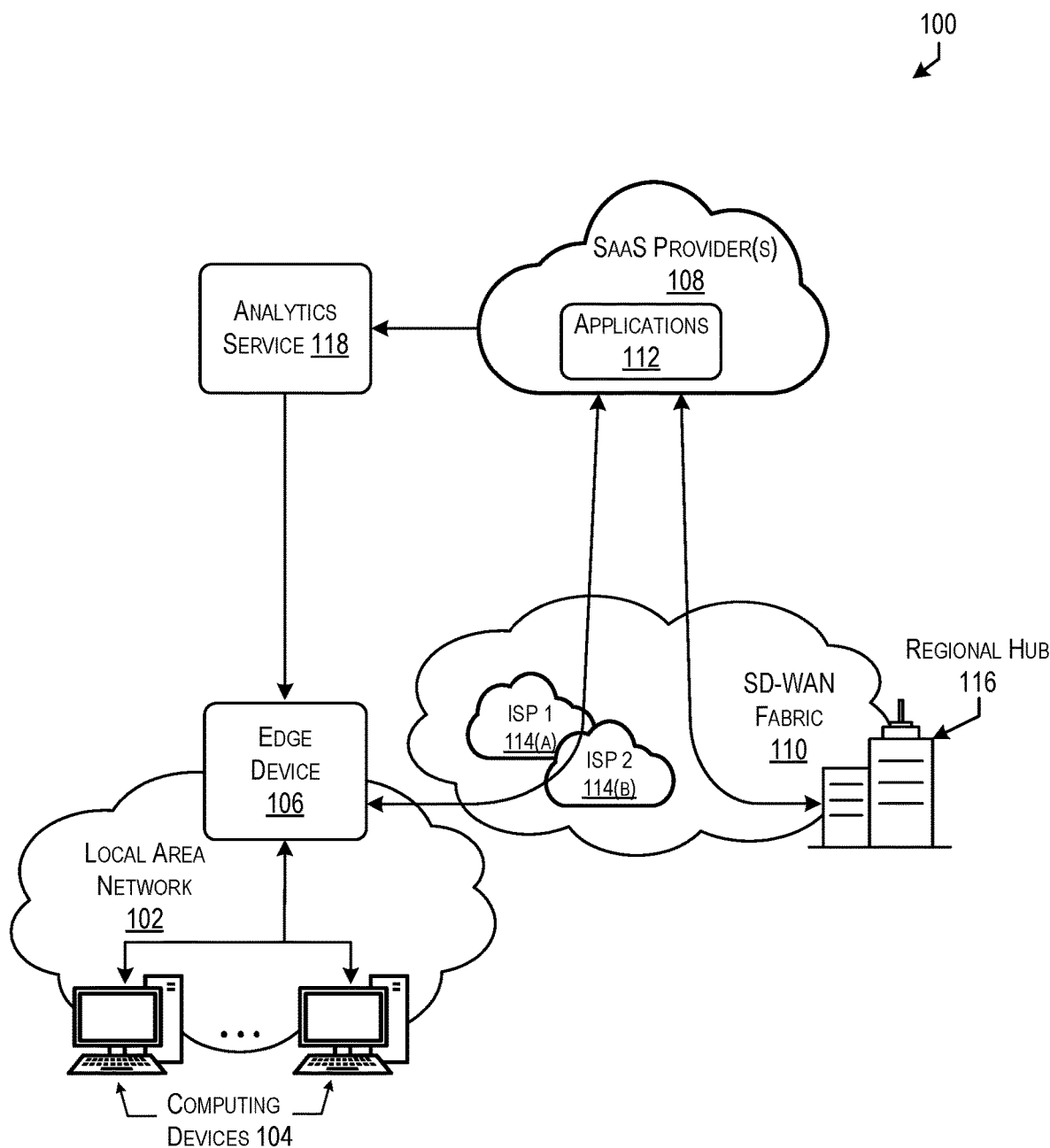
FIG. 1 depicts a block diagram illustrating an example network deployment environment that may be implemented in accordance with at least some embodiments.

A first method according to the techniques described herein may include determining, at an edge device, current metrics for a set of potential paths between the edge device and an application endpoint associated with an application. Further, the first method may include generating, at the edge device from the current metrics, a link score for individual paths in the set of potential paths. Additionally, the first method may include receiving, at the edge device, application status data generated from historic telemetry data associated with the application and the set of potential paths, and generating, at the edge device from the application status data, an application score for individual paths in the set of potential paths. Even further, the first method may include determining, at the edge device as a function of the link score and the application score for individual paths in the set of potential paths, a selected path to be used in communications between the edge device and the application endpoint.

A second method according to the techniques described herein may include generating, based on current metrics, a link score for individual paths in a set of potential paths associated with an application endpoint associated with an application. Further, the second method may include generating an application score for individual paths in the set of potential paths from historic telemetry data associated with the application. Even further, the second method may include determining, based on the link score and the application score for individual paths in the set of potential paths, a selected path to be used in communications between the edge device and the application endpoint.

Additionally, the techniques described herein may be performed by a system and/or device having non-transitory computer-readable media storing computer-executable instructions that, when executed by one or more processors, performs the method described above.

Example Embodiments

This disclosure describes techniques that may be performed by a computing device (e.g., an edge device) acting as a network gateway between two or more networks (e.g., a Local Area Network (LAN) and a SD-WAN fabric). The computing device may be configured to route communications between one or more user devices connected to it via a first network (e.g., the LAN) and one or more applications (e.g., services) hosted by a service provider platform (e.g., a SaaS provider) accessible over a second network (e.g., the SD-WAN fabric). To do this, the edge device may perform a path selection process to determine an appropriate path within the second network over which communications between the user device and the application are to be routed.

In some embodiments, the disclosure provides techniques for selecting optimal network paths for routing application data between a user device and an application hosted on a service provider (e.g., a SaaS provider platform). Such techniques may involve collecting current metrics (e.g., KPI values) for each of a set of potential paths to be traversed. A link score is then generated using the current metrics to represent a current status of each of the potential paths in the set of potential paths.

Additionally, the computing device receives application status data from the service provider that represents a status of an application with respect to each of the paths in the set of potential paths. The application status data may be generated by the service provider based on historical metric values collected by that service provider during operation of the application. An application status score is then generated based on the received application status data.

The computing device may calculate a ranking value for each of the paths in the set of potential paths. Such rankings may be determined as a function of the link score and the application status score. In embodiments, the function used to generate such a ranking may be weighted based on the confidence value associated with the application status data. For example, the confidence value may be used as a multiplier or other weighting factor that can affect a degree to which a role of each of the link score and application status score have on the resulting ranking value.

Once a ranking value has been calculated for each of the paths in the set of potential paths, a path may be selected from that set of potential paths for routing communications. In such a scenario, the edge device may receive a request from a user device to access the application as hosted by the service provider. Upon receiving that request, the edge device may establish a communication session between the user device and the application endpoint over the selected path.

In some embodiments, the disclosure provides techniques for using application programming interface (API) calls to retrieve custom application status data from a service provider. In response to such an API call, the application (or a service provider hosting that application) may retrieve telemetry data related to each of the set of potential paths. The telemetry data may include information about path performance metrics collected over time. In some embodiments, each piece of telemetry data stored in relation to a path may be associated with a number of data points, such as a date/time, a type of data sent, a tenant identifier, etc.

In embodiments, the edge device generates an API call that includes information about a tenant (e.g., user device), such that application status data retrieved by the service provider may be specific to that tenant. In this manner, such data may more accurately reflect the network status with respect to the tenant's particular use of that network to access the application. Additionally, the API call may be authenticated using an authentication key. For example, some portion of the data (e.g., a token) included in the API call may be encrypted using the authentication key. In another example, the API call may include a digital signature generated using the authentication key. Such an authentication key may be associated with either the edge device or the tenant and can be used to authenticate that the API call originated at the tenant identified in the API call.

In some embodiments, the API call may be generated to include some portion of application data. As noted elsewhere, network traffic may be treated differently in some situations depending on the network. In such situations, network traffic that does not include application data may not be treated the same as network traffic that includes application data. Accordingly, metrics generated by the API call may not accurately reflect the current status of the network. Additionally, telemetry data collected in relation to an application may only be collected for paths that are actually used to communicate with that application. Network paths that have not been used (or have not been used recently) may not typically have such telemetry data available. By sending a portion of application data to the application over one or more of the network paths, the service provider is able to update its current telemetry data for that application based on receiving that network data. In some cases, such an API call that includes application data is routed over only one of the paths in the set of potential paths. In other cases, such an API call that includes application data is duplicated and routed over each of the paths in the set of potential paths in order to cause the telemetry data to be updated for each of those paths.

Embodiments of the disclosure provide for a number of advantages over conventional systems. For example, as noted above, conventional systems that use only KPI metrics to make path decisions may not accurately reflect the status of the network, and particularly the relationship between the network and applications. For example, TCP probes are typically destined to ping end points rather than actual applications and may be subject to different treatment on the network than actual application traffic. In contrast, conventional systems that use only application QoE data to make best path decisions are only effective if the application being accessed is frequently used. While such QoE data can provide a good picture of the application's historic performance, such data can become outdated (e.g., "stale") and may not accurately reflect the current status of the network paths.

Embodiments of the current disclosure solve problems inherent in each of the above scenarios. Particularly, the disclosure provides for the ability to factor in both current KPI metrics and historical application status data in a manner that adapts automatically to that data (e.g., via weighting based on confidence values). For example, in the scenario in which the application status data is recent (and a confidence value associated with that data is high) the best path decision will place a greater weight on that application status data than on current KPI metrics. On the other hand, in the scenario in which the application status data is old (and a confidence value associated with that data is low) the best path decision will place a greater weight on current KPI metrics than the application status data. In this manner, the function used in best path selection can be dynamically adjusted based on what metric data is most likely to result in optimal path selection at any given time.

Additionally, embodiments in the disclosure allow the retrieval of tenant-specific telemetry from the Application directly from the SaaS provider due to its authenticated nature. This allows:

1. Faster convergence (or more recent telemetry data) as a middleware (e.g., a third-party analytics engine) can be eliminated 2. Application telemetry is collected by the SaaS provider when traffic is flowing through a path. When a path has already been selected and traffic is only flowing through that path, the SaaS provider is unable to collect telemetry data for other paths. By providing application data to the API endpoint via an API call, the SaaS provider can make an estimate of the application quality over all the links through which that API call is made.

FIG. 1 depicts a block diagram illustrating an example network deployment environment that may be implemented in accordance with at least some embodiments. In FIG. 1, a local area network (LAN) 102 may be accessed by a number of computing devices 104 at a remote site. As depicted, an edge device 106 located at the edge of a remote site may provide connectivity between the LAN 102 and one or more cloud-based, Software as a Service (SaaS) providers 108 over an SD-WAN fabric 110. The SaaS providers 108 may host one or more applications 112 to be accessed by the computing devices 104 at the remote site. For example, in the case of an SD-WAN fabric, edge device 106 may provide connectivity to SaaS provider (s) 108 via paths (e.g., tunnels) across any number of networks that make up the SD-WAN fabric 110. This allows clients using the LAN 102 of remote site to access cloud applications 112 (e.g., Office 365™, Dropbox™, etc.) served by SaaS provider(s) 108.

An edge device 106 may include any electronic device that provides an ingress/egress point for a network (e.g., LAN 102). The edge device 106 may act as a router for a client user device. An example of an edge device 106 may include a router, routing switch, integrated access device, multiplexer, or any other suitable device. The edge device 106 may include one or more processors and a memory that stores computer executable instructions for implementing at least a portion of the functionality described herein.

The SD-WAN fabric 110 may be implemented across a number of computing devices each acting as nodes in the SD-WAN fabric 110. The computing devices making up the SD-WAN fabric 110 may centralized or clustered in a single location or may be geographically distributed throughout one or more regions. Overseeing the operations of the SD-WAN fabric 110 may be an SDN controller. In general, an SDN controller may comprise one or more devices configured to provide a supervisory service, typically hosted in the cloud, to the SD-WAN fabric 110 and/or one or more SD-WAN service points. For instance, an SDN controller may be responsible for monitoring the operations thereof, promulgating policies (e.g., security policies, etc.), installing or adjusting IPsec routes/tunnels between LAN 102 and remote destinations such as regional hub 116 and/or SaaS provider (s) 108.

As would be appreciated, the SD-WAN fabric 110 may allow for the use of a variety of different pathways between an edge device 106 and a SaaS provider 108. For example, the edge device 106 may include, or may be in communication with, a router configured to route communications over the SD-WAN fabric 110 to one or more applications 112 hosted by the SaaS providers 108. In this example, the router may utilize two Direct Internet Access (DIA) connections to connect with SaaS provider(s) 108. More specifically, a first interface of the router may establish a first communication path (e.g., a tunnel) with SaaS provider(s) 108 via a first Internet Service Provider (ISP) 114(a), denoted ISP 1 in FIG. 1. Likewise, a second interface of the router may establish a backhaul path with SaaS provider(s) 108 via a second ISP 114(b), denoted ISP 2 in FIG. 1. In some embodiments, the router may establish a third path via a private corporate network (e.g., an MPLS network) to a private data center or regional hub 116 which, in turn, provides connectivity to SaaS provider (s) 108 via another network, such as a third ISP.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN 102 to SaaS provider(s) 108. Other deployments scenarios are also possible, such as using Colo, accessing SaaS provider(s) 108 via Zscaler™ or Umbrella™ services, and the like.

As noted above, the dynamics of Internet traffic has changed dramatically in recent years, in part due to the proliferation of SaaS applications. Traditionally, network topologies would be computed using traffic matrices thanks to off-line research operational tools allowing for traffic engineering (e.g., using IP, MPLS, etc.). However, with the emergence of SaaS applications, many large networks are now embracing a SaaS model for their critical applications, such as Dropbox™, Office 365™, SAP™ and the like. Thus, it becomes common for the in-house traffic to be sent to an internal data center, whereas the SaaS traffic is sent to various clouds. Such SaaS traffic may itself be sent to the private data center, to a security provider such as ZScaler™ or Umbrella™, a "Colo," or even directly to the SaaS provider from a branch office using a VPN.

One of the consequences of the emergence of SaaS traffic is that SaaS traffic tends to use a number of paths that may themselves exhibit various characteristics/key performance indicators (KPIs) in terms of QoE (e.g., loss, delay, jitter, throughput, etc.), thus leading to a strong variation of SLAs and user satisfaction. Typically, this is dealt with by specifying static SLAs on a per application basis using templates. For instance, one SLA template may specify that a tunnel is eligible to carry traffic for a voice application if it exhibits loss <3%, delay <150 ms, etc. Then, for each path, network probes may be used to measure the path characteristics and traffic is routed according to the respective SLAs. Unfortunately, such an approach is reactive in nature, meaning that a re-route only occurs after a problem exists. In some cases, SLA measurements can take up to one hour to act on the routing decision in order to avoid traffic oscillations. In the meantime, though, the QoE of the application will be impacted. Additionally, these network probes (e.g., HTTP HEAD requests or TCP pings) are typically configured to terminate at either dedicated ping endpoints that are set up by the SaaS provider 108 for this purpose or at some user-defined endpoint that is close to the SaaS provider 108. In either case, while the probe may reveal KPIs for a status of the majority of each path, those KPIs will not reflect the status of the respective path in its entirety. For the above reasons, the reliance on KPIs obtained from network probes for path selection may result in less optimal pathing.

In some cases, one or more computing devices may implement an analytics service 118 configured to receive aggregated information (e.g., metrics) about network traffic directed toward, and processed by, one or more of the applications 112 hosted by the SaaS providers. Such information can be used to generate application "QoE feedback" that reflects a status of various available paths in relation to particular applications. The QoE feedback can then be used to generate application status data that is provided to one or more edge devices for use in path selection. Path selection performed using this application status data may be made application-specific and may be more holistic, in that it accounts for each path in its entirety. However, it's worth noting that application status data generated by an analytics service 118 in this manner may become stale as the data used to generate that application status data continues to age. In other words, the application status data can become outdated if the application is not used (e.g., does not receive fresh traffic). This may also happen because of the processing times involved in the collection, computation, storage, retrieval, and normalization of the application status data. For the above reasons, the reliance solely on application status data obtained from aggregated application metrics for path selection may also result in less optimal path selection.

The techniques introduced herein improve the application experience for a user by predicting optimal path selection and using these predictions to trigger proactive path routing, to ensure an acceptable level of service. Specifically, according to various embodiments, a device (e.g., edge device 106) receives application status data from an analytics service 118 as noted above as well as KPIs for a number of paths obtained from network probes. The application status data provided by the analytics service 118 is accompanied by a confidence value that represents a degree of confidence associated with the accuracy of the generated application status data. Various factors may have an impact on the degree of confidence. For example, volatility (e.g., sudden or dramatic shifts) or instability in metrics for application traffic over a path may result in a decreased confidence value. Additionally, a confidence value may be increased or decreased based on an amount and timing of application traffic received over each path. The device then calculates a path to use within the SD-WAN fabric 110 for application traffic as a function of the application status data and the KPIs, where the application status data may be weighted based on the confidence value. In this way, path selection decisions can be made in a manner that more heavily relies upon application status data generated by an analytics service during certain times and that more heavily relies upon KPIs obtained from network probes at other times. These techniques are described in greater detail below.

Figure 2:
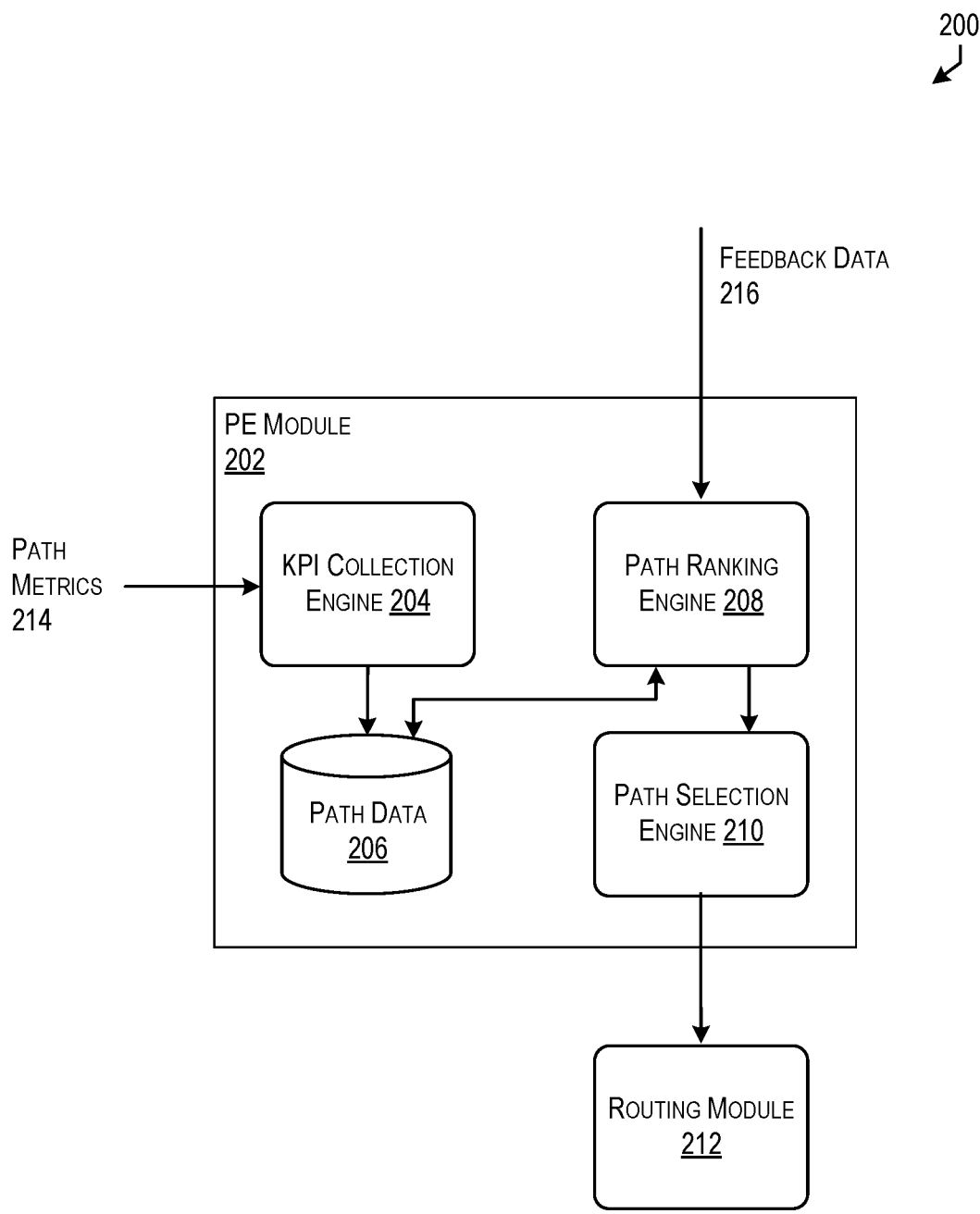
FIG. 2 depicts a block diagram illustrating a process for performing path selection in accordance with at least some embodiments.

FIG. 2 depicts a block diagram illustrating a process 200 for performing path selection in accordance with at least some embodiments. As shown, a path evaluation process may be performed by a path evaluation (PE) module 202. An exemplary path evaluation module 202 may include any or all of the following components: a KPI collection engine 204, a path database 206, a path ranking engine 208 and a path selection engine 210. The path evaluation module 202 may be in communication with a routing module 212 configured to implement determined path selections. As would be appreciated, the functionalities of these components may be combined or omitted, as desired. In addition, these components may be implemented on a singular device or in a distributed manner. For instance, these components may be executed by a particular router or other networking (e.g., edge) device, an SDN controller, or the like. Conversely, certain components of path evaluation module 202 may be executed on-box by a router or other networking device, while other components may be executed by a supervisory, such as an SDN controller. In the distributed case, the combination of executing devices can be viewed as their own singular device for purposes of executing a path evaluation process.

In embodiments, a KPI collection engine 204 collects path metrics 214 regarding the various existing paths and their corresponding KPIs, such as loss, latency, jitter, etc. To obtain path metrics 214, network probes may be sent along the paths and the resulting path metrics 214 are used to build and refresh a database of path data 206. In one embodiment, path metrics 214 can be collected via heart-beat messages such as BFD probes in an SD-WAN. In another embodiment, path metrics 214 can be captured by sending HTTP ping messages to the application endpoints, such as SaaS provider servers, to provide estimates of the loss, latency, and jitter along these paths. A plurality of probes can also be used to refine the paths and their KPIs such that a query to path data 206 identifies all paths between a pair of IP addresses, as well as the KPIs of the paths that represent the current (e.g., most recent) quality of the paths.

In various embodiments, path data 206 may be a centralized or distributed database, such as a cloud-hosted database, part of an SDN controller for an SD-WAN or in communication therewith, or the like, allowing routers or end-devices to query for path information.

A path ranking engine 208 may be configured to rank each of the available paths between a local network (e.g., LAN 102) and an application hosted by a SaaS provider (e.g., SaaS provider 108). During execution, path ranking engine 208 may identify a number of potential paths connecting a particular networking device with an application hosted by a SaaS provider. Once such paths have been identified, raw KPI data may be retrieved from the path data 206 in relation to each of those paths. The raw KPI data for each path is then used to generate a link score. For example, a link score may be calculated as a function of loss, delay, jitter, throughput, or other suitable factors determined for the routing path. In some cases, calculating a link score may involve assigning a numeric value to each of the relevant KPIs and either increasing or decreasing a base link score by each respective numeric value.

The path ranking engine 208 may further receive application status data 216. Application status data 216 may be specific to a particular application and may be generated as a function of metrics determined for network traffic received by the particular application as hosted by a SaaS provider. In some cases, the application status data 216 may be a numeric representation of a status of at least one routing path. In some cases, the application status data 216 may be non-numeric a representation of QoE, such as an indication that a particular path (with respect to a particular application) is "bad", "fair", "good", "excellent," etc. In the case that the application status data 216 is a non-numeric value, such application status data 216 may be converted into a numeric value (e.g., an application score). For example, a mapping may be maintained for each of a set of potential non-numeric data values to a corresponding numeric value. In this example, the application status data 216 may be converted into its corresponding numeric data value.

The application status data 216 may be accompanied by a confidence value that is a numeric representation of a likelihood that the current application status data 216 will persist. A confidence value may be calculated based on a volatility (e.g., rate of change) in the metrics for an application as well as an age or "staleness" of those metrics. For example, metrics that are more volatile (e.g., experiencing a higher degree of change in a given period of time) or metrics that are older (e.g., due to the application not having received any network traffic in some time) may be assigned a lower confidence value than metrics that are less volatile and fresh. In some embodiments, the confidence value may be represented as a percentage value (e.g., 90%).

In some embodiments, the application status data 216 (and corresponding confidence value) may be provided by a third-party analytics service (e.g., an entity unaffiliated with the edge device and/or SaaS provider). In these embodiments, the third-party service may receive updated metric data from one or more SaaS providers and may generate application status data to be associated with particular applications hosted by the SaaS providers based on those metrics. In some cases, the third-party service may query the SaaS providers on a periodic basis (e.g., every 30 minutes, etc.). In other cases, the SaaS provider may provide updated metrics to the third-party service as those metrics are obtained (e.g., as application traffic is processed).

In some embodiments, the application status data 216 (and corresponding confidence value) may be generated by the edge device. In these embodiments, the edge device may query the SaaS provider (e.g., on a periodic or as-needed basis) to obtain metrics associated with one or more applications. In some cases, to do this, the edge device makes an API call using an authenticated API instantiated on the edge device. This is described in greater detail later in the disclosure.

Once the path ranking engine 208 has received application status data and generated a numeric application score and determined a link score, the path ranking engine 208 may be configured to determine a ranking for each of a set of available paths between the edge device and an application. To do this, the path ranking engine 208 may apply a weight or multiplier based on the confidence value. For example, a simplified example of a path ranking equation might be:

$$P_n = (C_n * F_n) + ((100 - C_n) * K_n)$$

In the above equation, $P_n$ represents a ranking value assigned to a path n, $F_n$ represents a numeric QoE value (e.g., an application score) for path n, $C_n$ represents a confidence value assigned to the application score for path n, and $K_n$ represents a link score calculated for path n.

Once each of a number of paths have been assigned a ranking, that ranking information may be provided to a routing module 212 for implementation. In some cases, the routing module may update routing and/or forwarding tables based on the received path ranking information. Upon receiving a request from a user device to access an application hosted by a SaaS provider, the routing module 212 may be configured to identify an appropriate path (e.g., a path associated with the application having the highest ranking) and route communications between the user device and an application endpoint via that path.

Figure 3:
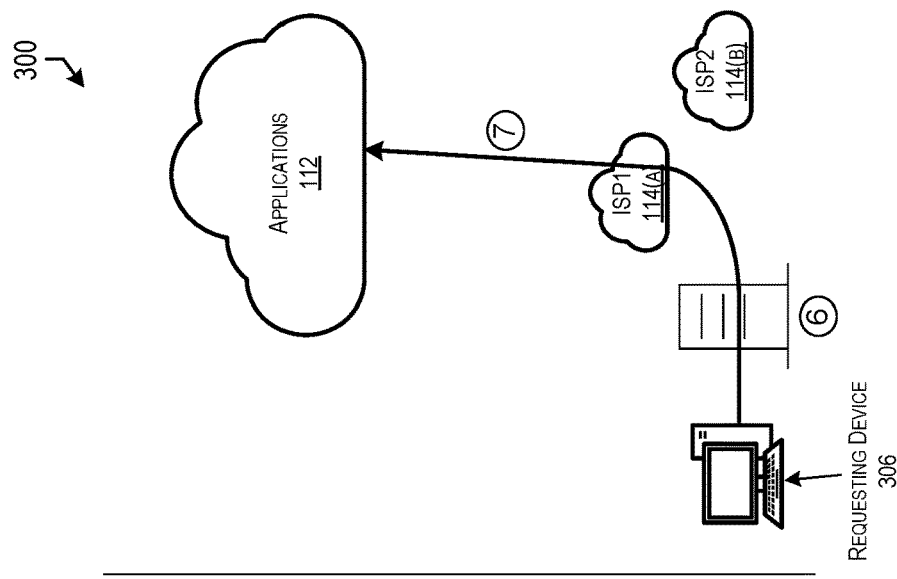
FIG. 3 depicts diagram illustrating an example process for routing data between a user device and an application hosted by a SaaS provider using path selection as implemented in accordance with at least one embodiment.
Figure 3:
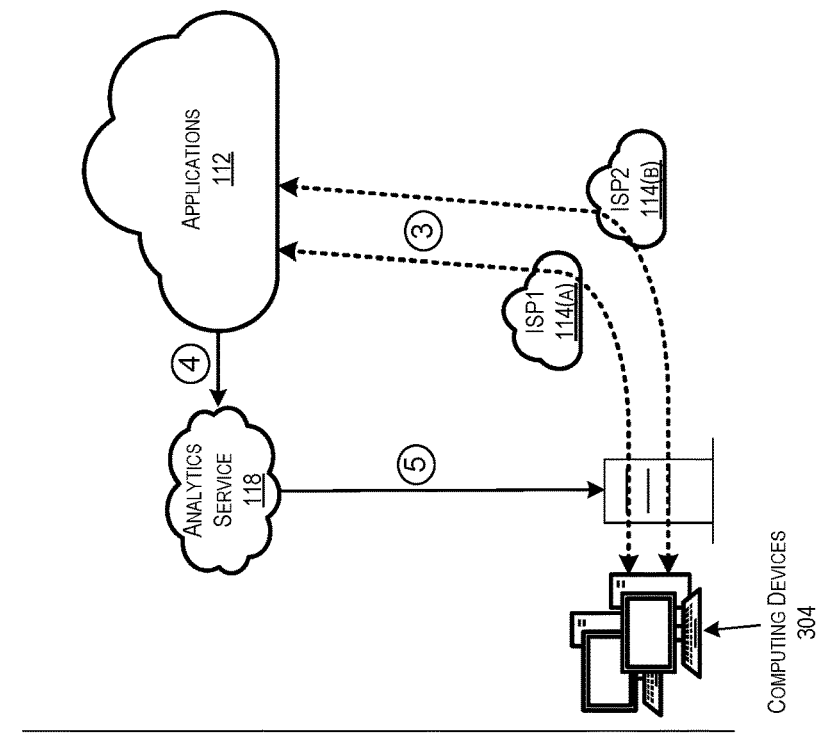
Figure 3:
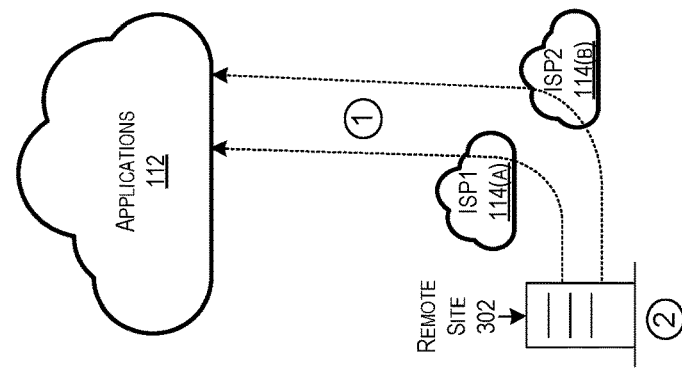

FIG. 3 depicts diagram illustrating an example process for routing data between a user device and an application hosted by a SaaS provider using path selection as implemented in accordance with at least one embodiment. In embodiments, the process 300 as illustrated in FIG. 3 may be implemented across various components in a network deployment environment, such as the example network deployment environment 100 as described in relation to FIG. 1 above.

At step 1 of the process 300, an edge device at a remote site 302 may identify a number of available paths between itself and one or more applications 112 hosted on a SaaS provider platform. Applications 112 may be examples of applications 112 described in relation to FIG. 1 above.

Upon identifying a number of paths (e.g., tunnels), the edge device may collect KPI metrics associated with each of the identified paths. To do this, the edge device may send probes (e.g., HTTP HEAD requests or TCP pings) to the various applications via each of the identified paths. The edge device then measures, and records, metrics associated with each path as determined in response to each of the respective probes. The resulting KPI metrics for each path reflect a current status of the network.

At step 2 of the process 300, the edge device calculates a link score for each of the paths based on the collected KPI metrics for that path. As noted elsewhere, this may involve assigning numeric values to each of the KPI metrics collected in relation to a path. A link score may be generated as a function of numeric values associated with the KPI metrics.

At step 3 of the process 300, the applications 112 hosted on the SaaS provider platform may be accessed by a number of computing devices 304 located at, or at least using a local network associated with, the remote site 302. Each request by a computing device 304 to access an application is received at the edge device and subsequently routed over one of the available paths. As application data is conveyed between the edge device and the applications 112 hosted on the SaaS provider platform, metrics may be obtained in relation to the path used to convey that application data.

At step 4 of the process 300, metrics obtained in relation to each of the applications and respective paths is collected and provided to another entity. In some cases, as in the depicted example, the metrics are provided to an analytics service 118, which may be an example of the analytics service 118 as described in relation to FIG. 1 above. In other cases, the metrics may be provided directly to the edge device upon receiving a request for those metrics from that edge device (e.g., via an authenticated API call). The metrics may be aggregated and used to generate an application score that represents a status of each of the available paths with respect to one or more applications 112 over time. Additionally, a confidence value is generated to be associated with the application score for each path. In some cases, such an application score may continue to be updated or augmented as new metrics are received for each of the paths/applications. At step 5 of the process 300, the application status data generated by the analytics service 118 (as well as a respective confidence value) may be provided to the edge device at the remote site 302.

At step 6 of the process 300, the edge device may perform a process for performing path selection, an example of which is described in greater detail with respect to FIG. 2 above. In some cases, this might involve ranking each of the paths using a function that accepts a link score as generated at step 2 as well as an application score (e.g., a numeric representation of application status data) as generated at step 4. The function may be weighted based on the confidence value associated with the respective application score. In some embodiments, the rankings for each path/application are then provided to a routing module to be implemented by the edge device.

At step 7 of the process 300, a request to access an application 112 hosted on the SaaS provider platform is received from a requesting computer 306 located at the remote site 302. Upon receiving the request, the edge device can consult the generated rankings to determine the optimal (e.g., highest ranked) path to be used by the requesting device 306 in accessing the application 112. The edge device then establishes a communication session between the requesting device and the application 112 via that optimal path.

Figure 4:
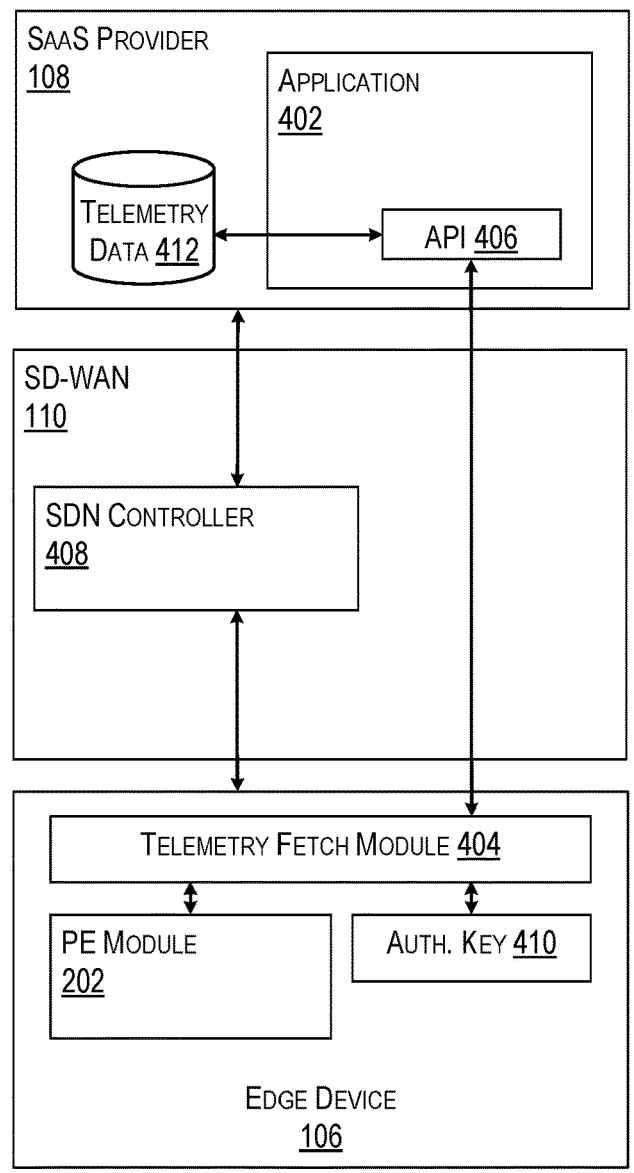
FIG. 4 depicts a block diagram comprising a process for retrieving telemetry data on demand via interactions between a number of components implemented in accordance with some embodiments as described herein.

FIG. 4 depicts a block diagram comprising a process for retrieving telemetry data on demand via interactions between a number of components implemented in accordance with some embodiments as described herein. More particularly, the process involves interactions between an edge device 106, a SaaS provider 108, and an SD-WAN fabric 110, each of which may be examples of the respective components as described with respect to FIG. 1 above.

As described elsewhere, an edge device 106 may be configured to receive, from a user device, a request to access an application 402 instantiated on, and managed by, a SaaS provider 108 over one or more paths (e.g., tunnels) implemented within an SD-WAN 110. In order to process that request, the edge device 106, or rather a path evaluation (PE) module 202 instantiated on the edge device 106, may use both current telemetry data and application status data for the application 402 to determine an appropriate path to be used by the user device to access the application 402. In some embodiments, as described in relation to FIG. 3 above, application status data may be provided by an analytics service to the edge device. However, in other embodiments, as shown in FIG. 4, the edge device may retrieve application status data and current path telemetry data directly from the SaaS provider 108. In these embodiments, the edge device 106 may include a telemetry fetch module 404 that is configured to interact with the application 402 via an application programming interface (API) 406 included on the SaaS provider 108.

In embodiments, an SDN controller 408 may establish a means to authenticate an edge device to a SaaS provider 108. To do this, the SDN controller 408 may generate, retrieve, or otherwise determine, an authentication key 410 to be associated with an edge device and/or a particular customer. In some embodiments, the SDN controller 408 may retrieve the authentication key to be associated with an edge device from a SaaS provider. In some embodiments, the authentication key 410 may be a cryptographic key to be used in one or more cryptographic operations (e.g., encryption, decryption, electronic signing, etc.). Such an authentication key 410 may be a symmetric or asymmetric cryptographic key. In some embodiments, the authentication key 410 may be a digitally signed authentication token. Upon generating or determining an authentication key 410 to be associated with the edge device 106, the SDN controller 408 may provide that authentication key 410 to the edge device to be provisioned onto that edge device. In some embodiments, the authentication key 410 may be stored in a secure memory of the edge device 106.

The telemetry fetch module 404 may use the authentication key 410 to cryptographically secure and/or sign communications between itself and the SaaS provider 108. In some embodiments, a second cryptographic key may be provided to the SaaS provider (e.g., by the SDN controller) to be used in cryptographic operations (e.g., encryption, decryption, electronic signing, etc.) performed on communications received from the edge device.

In some embodiments, the SaaS provider 108 may collect and store telemetry data 412 associated with each of the applications hosted by that SaaS provider 108. In some cases, such telemetry data may be stored in relation to particular customers and/or edge devices. In some cases, such telemetry data may be stored in relation to particular paths used to route either received or transmitted application data.

In the process 400, the telemetry fetch module 404 may generate current telemetry and/or an application score to be provided to a PE module 202. In some embodiments, the telemetry fetch module 404 is configured to provide that data to the PE module 202 on a periodic basis (e.g., every 30 minutes, every hour, etc.). In some embodiments, the telemetry fetch module 404 is configured to provide that data to the PE module 202 when a request is received from a PE module for a customer to access an application hosted on a SaaS provider 108.

To generate this data, a telemetry fetch module 404 may generate a call to an application programming interface (API) 406. Such an API call, as generated by the telemetry fetch module 404, may include a portion of application data specific to the application 402. Note that some networks may treat routing/analysis network traffic (e.g., pings) differently than they do regular network traffic. In these cases, the inclusion of application data in the API call may cause the resulting network traffic to be treated the same as regular application network traffic. Additionally, in some cases, where an application hasn't been utilized in quite some time, the latest telemetry data for that application may be outdated. In these cases, the inclusion of application data in the API call may also cause the network telemetry for that application to be updated based on the API call, ensuring that the telemetry data is more up to date than it otherwise might be.

In some embodiments, the API call may include an identifier to be used to identify the edge device 106 and/or the user device requesting access to the application 402. Additionally, an API call may be secured and/or signed using an authentication key 410. Upon receiving the API call, the API 406 may determine an authentication status of the API call based on verifying the use of the authentication key 410. In some embodiments, the API 406 may decrypt a portion of the API call that has been encrypted using the authentication key 410 (e.g., using a second cryptographic key associated with that edge device). In some embodiments, the API 406 may verify an electronic signature appended to the API call generated using the authentication key 410.

Based on the API call, the API 406 may retrieve, and aggregate telemetry data associated with that API call from the telemetry data 412. In some cases, the telemetry data may be specific to a customer indicated in the API call. Additionally, the telemetry data may be provided separately for each potential path that can be used to access the application within the SD-WAN 110. The telemetry data may include any suitable metrics regarding the availability/performance for each of the paths. In some embodiments, the SaaS provider may generate application status data (e.g., QoE data) from the telemetry data for a particular path.

In some embodiments, the retrieved/aggregated telemetry is then provided (e.g., as a response to the API call) back to the telemetry fetch module of the edge device 106. Upon receiving that telemetry data, the telemetry fetch module may generate an application score for each of the paths along which application data may be communicated with the SaaS provider. Additionally, the telemetry fetch module 404 may further compute a confidence value to be associated with each of the calculated application scores. As noted elsewhere, such a confidence value may be calculated based on an age and/or stability of the received telemetry data. The telemetry fetch module 404 may provide the application scores/confidence values to the PE module 202 to be used as described in the process 200 as described in greater detail with respect to FIG. 2 above.

In some cases, the telemetry fetch module 404 may further determine current telemetry data for each of the paths. For example, the telemetry fetch module 404 may send out one or more probes to determine such telemetry data for the paths. In another example, current telemetry data may be determined based on the API call generated by the telemetry fetch module. In this example, the API call may be duplicated and transmitted over each of the potential paths in order to update application telemetry as calculated for the respective paths by the SaaS provider as well as to obtain current telemetry data (e.g., KPI metrics) back from the SD-WAN for each of those paths.

Figure 5:
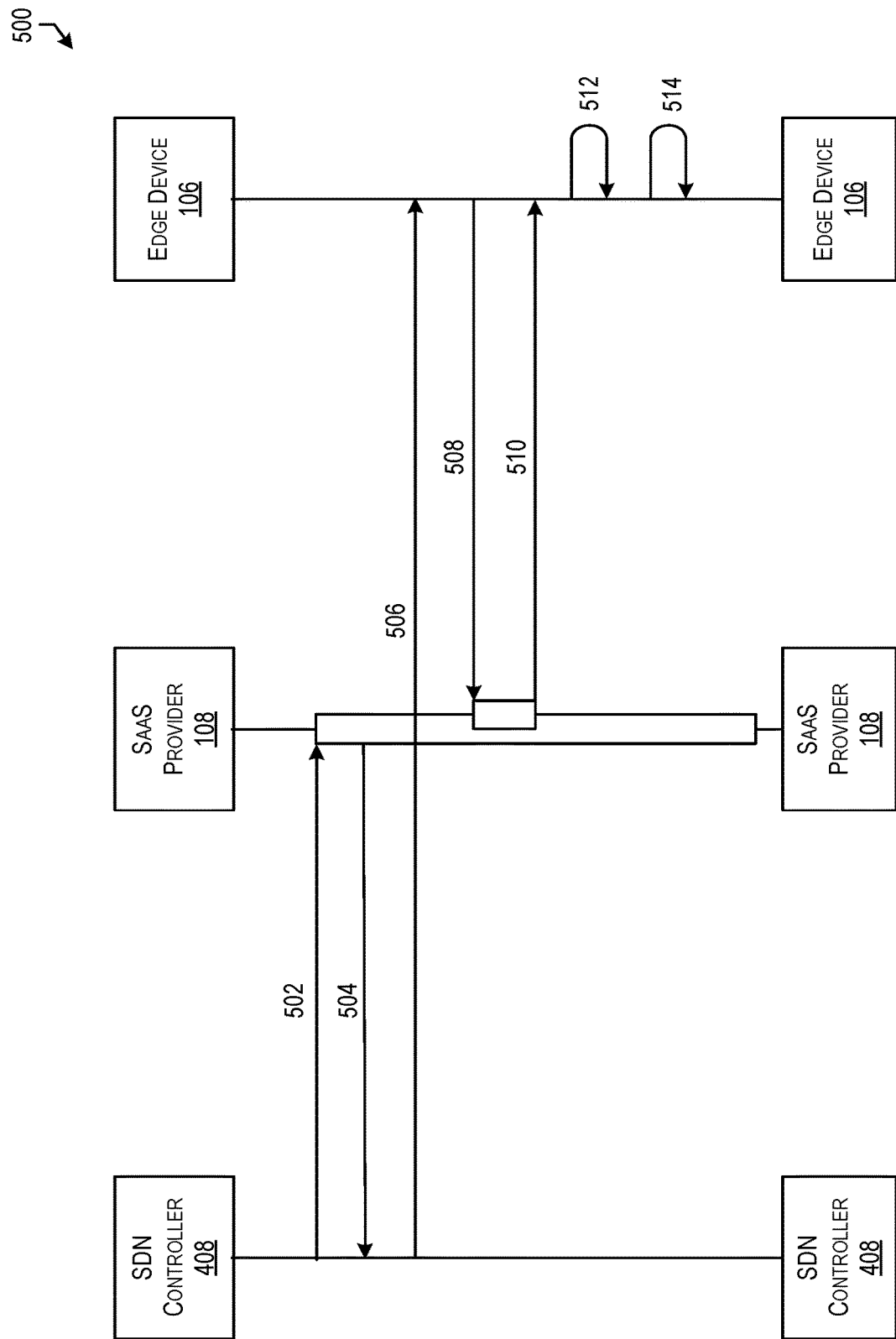
FIG. 5 depicts a sequence diagram illustrating a process for fetching telemetry data to be used in path selection in accordance with at least some embodiments.

FIG. 5 depicts a sequence diagram illustrating a process for fetching telemetry data to be used in path selection in accordance with at least some embodiments. The process 500 may be performed by one or more of the components described in relation to FIG. 4 above. More particularly, the process 500 is described as a series of interactions occurring between an edge device 106, a SaaS provider 108, and an SDN controller 408.

At step 502 of the process 500, an SDN controller 408 may perform a subprocess to provision an authentication key onto an edge device to be used to authenticate that edge device and/or a tenant associated with the edge device. In embodiments, the SDN controller receives information about a new edge device to be set up or a new tenant to be associated with an existing edge device. Upon receiving the information, the SDN controller may access an account maintained at the SaaS provider 108. In some embodiments, this may involve using access credentials (e.g., a login and password) associated with a secure account (e.g., an administrator account) to authenticate the SDN controller to the SaaS provider.

At step 504 of the process 500, the SDN controller receives an authentication key and/or an identifier from the SaaS provider 108. In embodiments, the SDN controller may provide information about the tenant (i.e., customer) to the SaaS provider 108 to be stored in relation to an account maintained by the SaaS provider 108. For example, the SDN controller may provide an indication of one or more edge device 106 used by the tenant to connect with the SaaS provider 108. In another example, the SDN controller may provide information about a business entity operated by the tenant and/or a level of service to be provided to the tenant (e.g., via an SLA). Upon receiving information about the tenant from the SDN controller, the SaaS provider 108 may create an account to be associated with the tenant. Additionally, the SaaS provider 108 may assign that account a unique identifier to be used in identifying the tenant in future communications. In embodiments, the SaaS provider 108 may also identify/generate an authentication key (e.g., a cryptographic key) to be assigned to that account. The SaaS provider 108 may then provide the identifier and/or the SDN controller 408 to be relayed to at least one edge device 106.

At step 506 of the process 500, the SDN controller 408 may provide the identifier and the authentication key to an edge device 106 associated with the tenant at issue. Additionally, the SDN controller may further provide information about a configuration of one or more applications to be accessed via the edge device 106. The edge device 106 is then configured using the provided data. In some embodiments, the SDN controller may provide a list of potential paths (e.g., tunnels) that can be used by the edge device 106 to access one or more applications hosted by the SaaS provider 108.

Once the edge device 106 has been configured, the edge device 106 may facilitate communications between one or more tenants (e.g., user devices) and one or more applications hosted by the SaaS provider 108. Such facilitation may involve making a determination of an optimal routing path. In some cases, once the edge device 106 receives a request from a tenant to access an application, the edge device may retrieve telemetry data and proceed to determine the routing path to be used based on that telemetry data.

The edge device, once configured, may perform a subprocess (represented by steps 508-514) to select a path to be used in communications between the edge device and an application endpoint on a SaaS provider 108. In some cases, such a subprocess may be performed on a periodic basis. In some cases, such a subprocess may be performed on demand. For example, steps 508-514 may be performed upon receiving a request from a tenant/user device to access an application hosted on the SaaS provider 108.

At step 508 of the process 500, the edge device 106 makes a fetch-telemetry API call to the application hosted on the SaaS provider 108. In some embodiments, this may involve generating application-specific data to be sent to the SaaS provider 108 over one or more available paths. In some cases, default or exemplary application data is stored by the edge device for use in making such API calls. In some cases, the API call is made over one of the potential paths available to route communications between the edge device 106 and the SaaS provider 108. In some cases, the API call is duplicated and transmitted over each of the potential paths available to route communications between the edge device 106 and the SaaS provider 108. Note that this results in generating application network traffic, which is then used to update application status data maintained for that application.

The API call(s) generated by the edge device 106 may include the identifier assigned to the tenant/user device that submitted the request and may be secured using an authentication key assigned to the tenant/user device. In some cases, at least a portion of data included in the API call may be encrypted using the authentication key. In some cases, the API call may include an electronic signature generated using the authentication key, the electronic signature capable of being used to authenticate the tenant and/or edge device from which the API call(s) originated.

At step 510 of the process 500, the SaaS provider 108 may respond to the API call by providing information derived from telemetry data. In some cases, the SaaS provider 108 may generate a separate application score (or raw telemetry data) for each of the potential paths that may be used to communicate between the edge device 106 and the application endpoint on the SaaS provider based on respective telemetry data collected for each path. In some embodiments, the SaaS provider 108 may also provide, in response to the API call, an indication of current KPI metrics (e.g., loss, latency, jitter, etc.) for each of the respective paths. In some cases, the application score may be accompanied by a confidence value that represents a likelihood that the current status of the path is likely to persist.

In embodiments, the application score calculated by the SaaS provider 108 in response to an API call may be specific to the tenant and/or edge device associated with that API call. For example, the SaaS provider 108 may determine an identity of the tenant associated with the API call based on an identifier for the tenant being included in the API call.

Once the tenant has been identified, the SaaS provider 108 may retrieve telemetry data that pertains to communications origination from that tenant and may calculate an application score based on that telemetry data. In some cases, the SaaS provider 108 may instead retrieve telemetry data related to communications originating from the edge device 106 and may calculate an application score based on that telemetry data. This allows for a more customized approach to path selection than would otherwise be available.

At step 512 of the process 500, the edge device 106 may calculate a link score for each of the potential paths that may be used to communicate between the edge device 106 and the application endpoint on the SaaS provider 108 based on the KPI metrics received in relation to each of those paths.

At step 514 of the process 500, the edge device may select a path to be used to route communications between a tenant/user device (as noted in relation to step 508) and the application. To do this, the edge device may use a weighted function into which the application score, the link score, and the confidence value (associated with the application score) are provided as input values. Using this function (described in greater detail with respect to FIG. 2 above), the effect (e.g., weight) of the application score and the link score on a particular path ranking may be adjusted based on the confidence value. By calculating rankings for each of the available paths using this function, an optimal path can be identified as the path having the highest ranking. Once such an optimal path has been identified that path may be selected for use by the tenant/user device in communicating with the requested application. The edge device 106 may then route requests directed to the application by that tenant to the application endpoint via the selected path.

Figure 6:
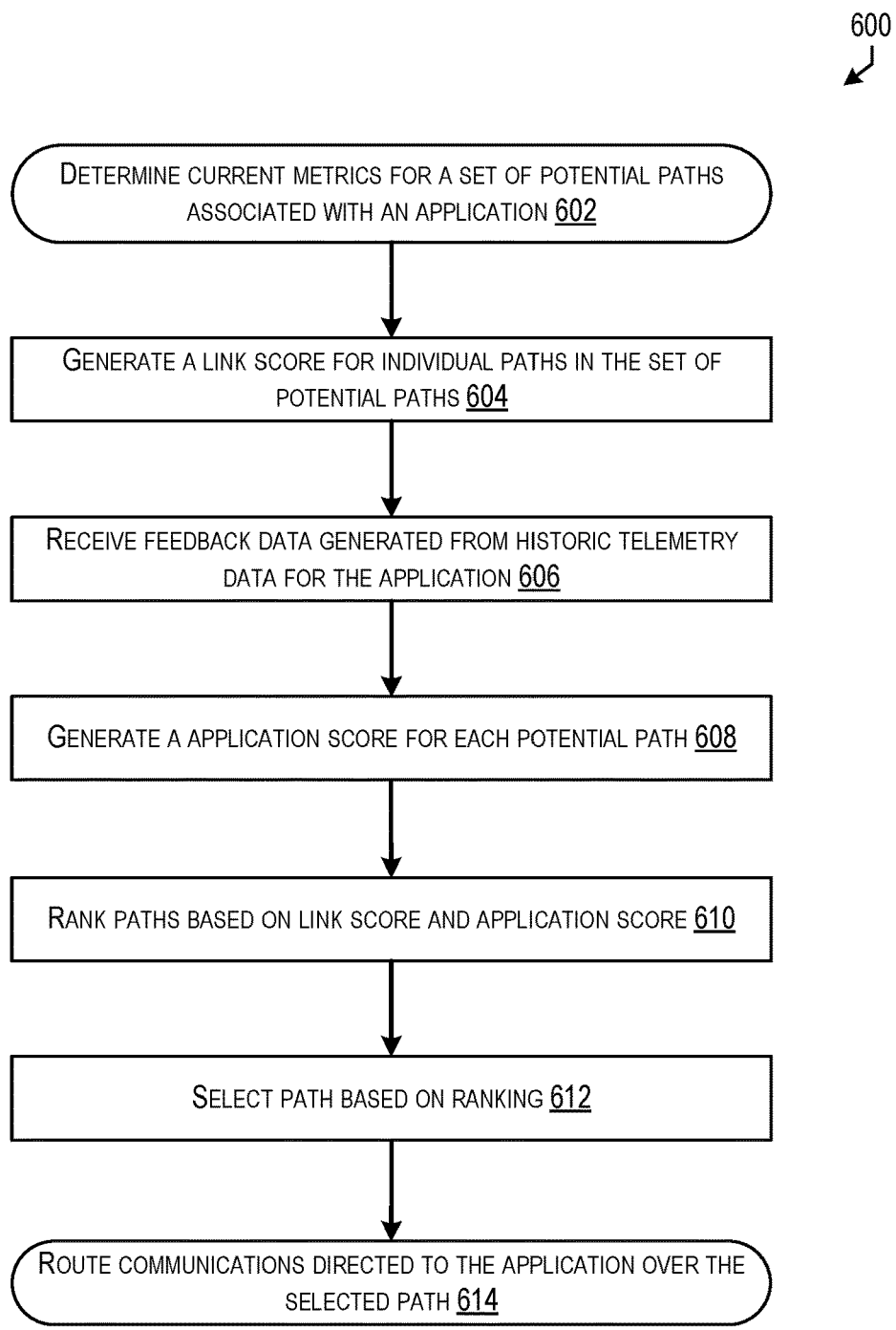
FIG. 6 depicts a flow diagram illustrating an exemplary process for selecting a path to be used to access an application in accordance with at least some embodiments.

FIG. 6 depicts a flow diagram illustrating an exemplary process for selecting a path to be used to access an application in accordance with at least some embodiments. While the process 600 is depicted as a series of blocks, it should be noted that the steps described in relation to process 600 may be performed in any suitable order. The process 600 may be performed by an edge device, such as edge device 106 as described in relation to FIG. 1 above. Such an edge device may be any suitable device capable of acting as a Transport Control Protocol (TCP) proxy for a user device. In embodiments, the edge device acts as a gateway between a local area network (LAN) and a software-defined wide area network (SD-WAN) fabric. The edge device may receive requests from user devices over the LAN to access an application is hosted on a Software as a Service (SaaS) provider platform.

At step 602, the process 600 may involve determining current metrics for a set of potential paths associated with an application. Such current metrics may include at least one of a loss, latency, jitter, or any other suitable metric for individual paths in the set of potential paths. The set of potential paths may include a set of tunnels or Direct Internet Breakout Links across networks that make up a software-defined wide area network (SD-WAN) fabric. To determine current metrics for the set of paths, the edge device may send a number of probes through the set of potential paths and collect the current metrics as determined based on information obtained via the number of probes.

At step 604, the process 600 may involve generating a link score for individual paths in the set of potential paths. A link score may be a numeric representation of the current status of a network path. Such a link score may be calculated as a function of values from the current metrics. For example, KPI metrics may be converted to numeric values and combined in some manner to form the link score.

At step 606, the process 600 may involve receiving application status data generated from historic telemetry data for the application. In some embodiments, the historic telemetry data is provided by a software as a service (SaaS) platform hosting the application. In some embodiments, the historic data is provided by a third-party service (e.g., a service unaffiliated with the SaaS platform) that collects telemetry from the SaaS platform. In some embodiments, the historic telemetry data is retrieved by the edge device from an application directly. This is described in greater detail with respect to the process 700 of FIG. 7 below.

In some embodiments, the process 600 may further involve receiving a confidence value associated with the application status data, wherein the selected path is further determined as a function of the confidence value. A confidence value may be any representation of a degree of likelihood that the application score is likely to persist. In embodiments, the confidence value may be represented as a percentage or ratio. As noted elsewhere, a confidence value may be calculated as a function of a stability of an application (e.g., a value that is inverse to a rate of change in the status of the application) and an age of the telemetry data maintained by the application (with newer telemetry data resulting in a higher confidence value).

At step 608, the process 600 may involve generating an application score for each of the paths in the set of potential paths based on the historic telemetry data for the application. An application score may be any numeric representation of a historic status of a path with respect to routing of application data associated with the application. In embodiments, an application score for each path may be calculated to represent a current QoE of each path within an SD-WAN fabric capable of conveying application data to and from the application. Accordingly, the application score may be calculated from historic data, with more recent data playing a bigger role (e.g., having a higher weight) in such calculations.

At step 610, the process 600 may involve calculating a ranking for each of the paths in the set of potential paths. A ranking may be any suitable indication of a score or priority to be associated with a particular path. Such a ranking may be calculated for each individual path as a function of the respective application score and link score. More particularly, the ranking may be calculated as some the sum of the products of each of the respective scores and some multiplier. In embodiments in which a confidence value is provided in association with the feedback data, the multiplier may be based on that confidence value. In this way, the weight of each of the respective scores (e.g., application score and link score) may be changed based on the confidence in the application feedback. As presented above, an exemplary equation for calculating a ranking value for each path may be:

$$P_n = (C_n * F_n) + ((100 - C_n) * K_n)$$

In the above equation, $P_n$ represents a ranking value assigned to a path n, $F_n$ represents an application score for path n, $C_n$ represents a confidence value assigned to the application score for path n, and $K_n$ represents a link score calculated for path n.

At step 612, the process 600 may involve selecting a path for future communications to the application based on the determined rankings. In embodiments, the selected path may be the path that has the highest ranking. In the scenario that there is a tie between two paths with the highest ranking, the edge device may select one of those paths based on any suitable factor. For example, the edge device may select the path randomly from multiple paths tied at the highest ranking. In another example, the edge device may select the path least used, or one that hasn't been used in the longest amount of time from multiple paths tied at the highest ranking.

At step 614, the process 600 may involve routing communications received from one or more user devices (e.g., tenants) to the application via the selected path. For example, the edge device may receive a request from a user device via a LAN to access an application. In this example, upon receiving the request, the edge device may identify the selected path for that particular application. The edge device may then complete the request by putting in place a communication session between the user device and an application endpoint for that application via the selected path. This involves the edge device routing any communication packets received from the user device through the selected path as well as routing communication packets received from the application to the user device.

Figure 7:
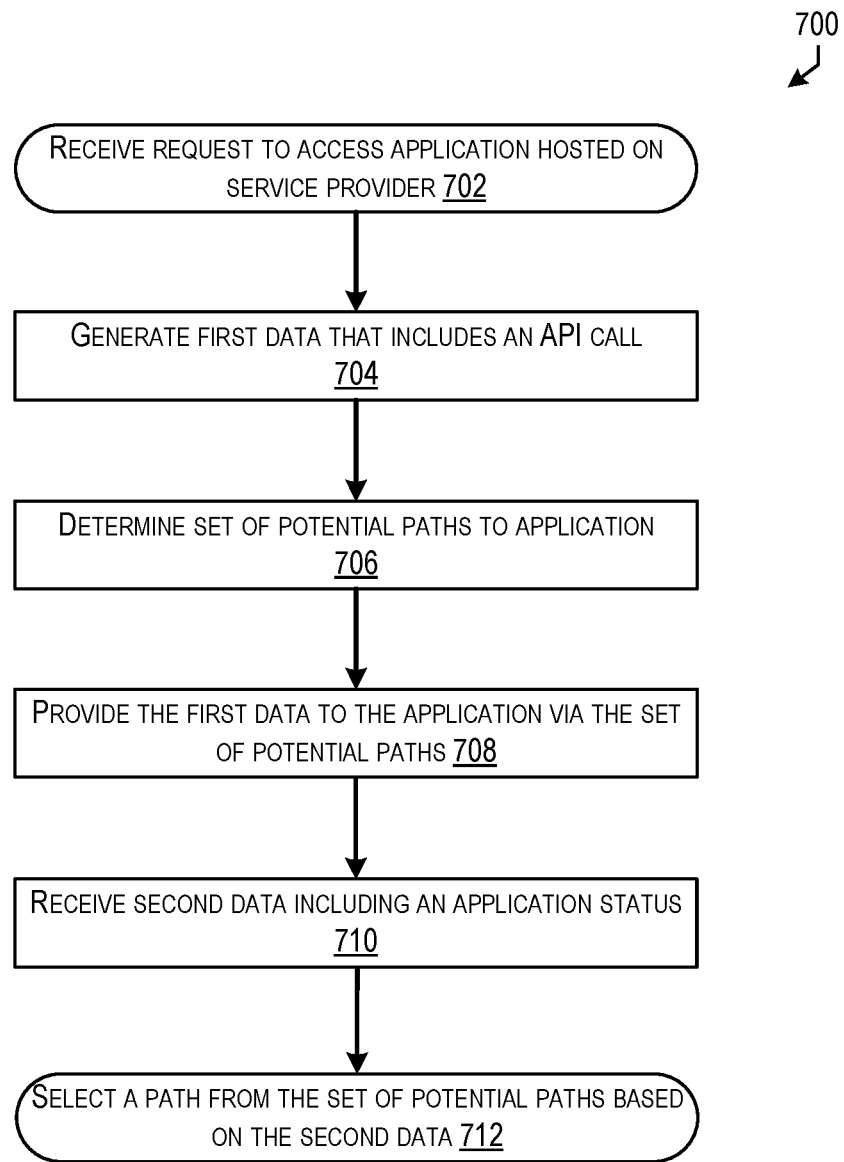
FIG. 7 depicts a flow diagram illustrating an exemplary process for retrieving user-specific telemetry data for an application in accordance with at least some embodiments.

FIG. 7 depicts a flow diagram illustrating an exemplary process for retrieving user-specific telemetry data for an application in accordance with at least some embodiments. While the process 700 is depicted as a series of blocks, it should be noted that the steps described in relation to process 700 may be performed in any suitable order. The process 700 may be performed by an edge device, such as edge device 106 as described in relation to FIG. 1. It should further be noted that the process 700 may be event driven (e.g., performed upon occurrence of an event) or may be performed on a periodic basis (e.g., a predetermined time intervals).

In some embodiments, the edge device may act as a Transport Control Protocol (TCP) proxy between one or more user devices included in a local area network (LAN) and a service provider. In some embodiments, the edge device may act as a router configured to perform policy-based network traffic routing without acting as a proxy. The edge device is configured to convey application data over a number of potential paths within a separate network, such as a software-defined wide area network (SD-WAN) fabric. The service provider may be a software as a service (SaaS) provider platform.

At step 702, the process 700 may involve receiving, in relation to a tenant, a request to access an application hosted by a service provider. In some embodiments, the request to access the application hosted by the service provider is received from a user device connected to the edge device via a LAN.

At step 704, the process 700 may involve generating a first data that includes an application programming interface (API) call to the application. In some cases, the first data may include at least an identifier that may be used to identify the tenant.

In some embodiments, the process 700 may further involve authenticating the first data using an authentication key. Such an authentication key may be associated with either the edge device or the tenant. In one example, authenticating the first data using the authentication key may involve encrypting at least a portion of the first data using the authentication key. In another example, authenticating the first data using the authentication key may involve appending a digital signature to the first data using the authentication key.

In some embodiments, the process 700 may further involve including some portion of application data into the first data for transmission to the application end point. For example, the edge device may maintain exemplary, or default, application data associated with each of a number of applications accessed by tenants of that edge device. In this example, upon receiving a request to access a particular application, the edge device may retrieve the exemplary application data stored in relation to that particular application and may include that exemplary application data in the first data corresponding to the API call. Application data may include any information typically consumed by an application hosted on a service provider platform during its operation. For example, application data may include text, image, audio, or any other suitable data type that is typically provided to an application for processing by that application. In this example, the application data associated with a particular application may be of the same data type that is typically provided to the application.

At step 706, the process 700 may involve determining a set of potential paths between the edge device and an application endpoint associated with the application hosted by the service provider. Each of the paths in the set of paths may be a separate route through nodes of a network (e.g., a SD-WAN).

At step 708, the process 700 may involve providing the first data to the application endpoint via at least one path of the set of potential paths. In some embodiments, providing the first data to the application endpoint via at least one path of the set of potential paths may involve duplicating the first data and providing the duplicated first data to the application endpoint over each of the paths in the set of potential paths. In the case in which application data has been included in the first data, the network telemetry obtained in relation to the tenant is caused to be updated based on new network telemetry obtained in relation to the provided first data.

At step 710, the process 700 may involve receiving second data including an application status generated from metrics obtained in relation to the tenant. In some embodiments, the application status may be a numeric representation of a quality of experience (QoE) for the application. For example, the application status may be a numeric value calculated based on historic telemetry data collected during the use of the application.

At step 712, the process 700 may involve selecting, based on the second data, a path of the set of potential paths to be used by the tenant to access the application.

In some embodiments, the second data received from the service provider may further include key performance indicator (KPI) metrics associated with the at least one path of the set of potential paths. In these embodiments, the path may be selected from the set of potential paths based at least in part on the KPI metrics.

Figure 8:
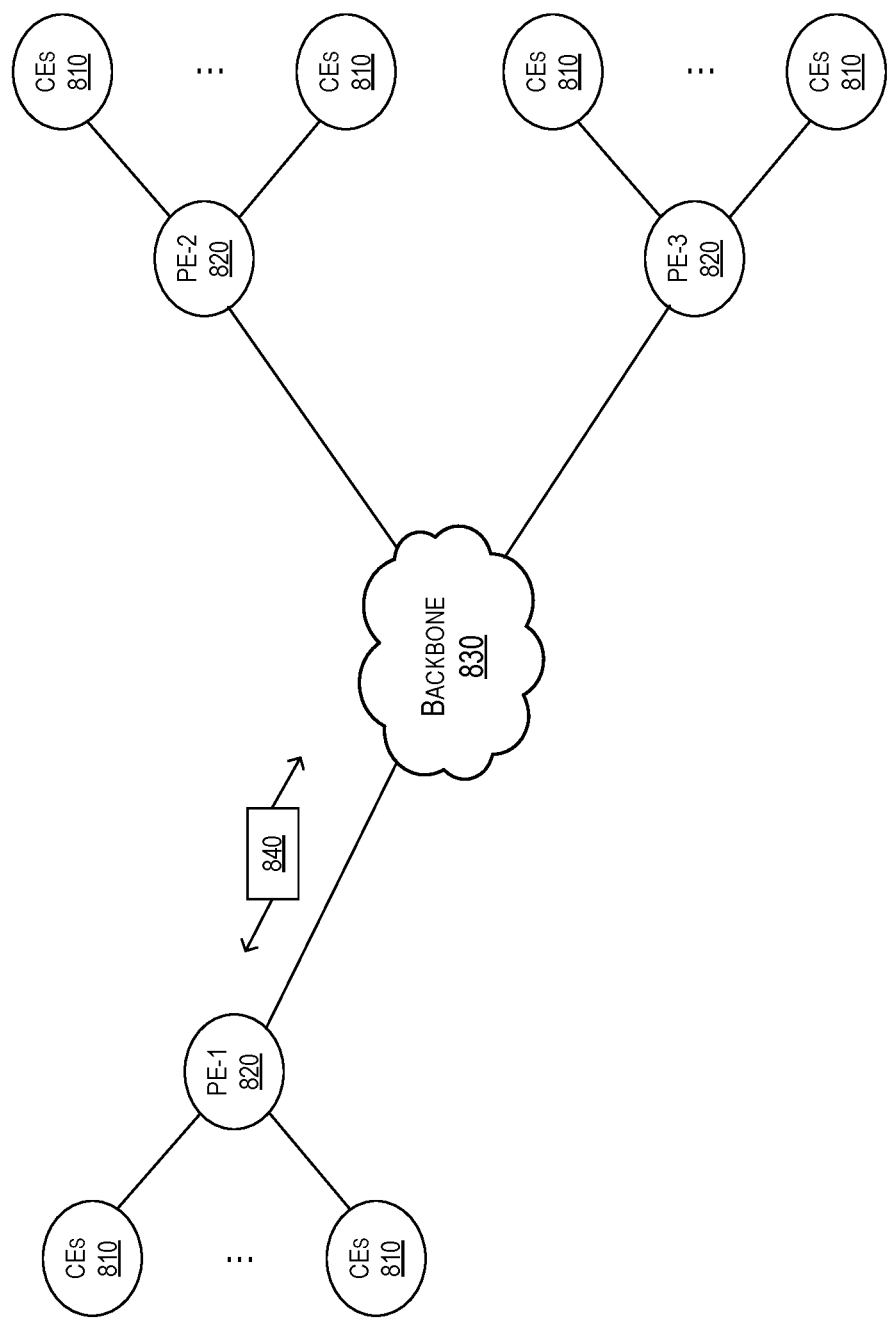
FIG. 8 is a schematic block diagram of an example computer network illustratively comprising nodes/devices, such as a plurality of routers/devices interconnected by links or networks, as shown.

FIG. 8 is a schematic block diagram of an example computer network 800 illustratively comprising nodes/devices, such as a plurality of routers/devices interconnected by links or networks, as shown. A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANS). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

In the depicted example, customer edge (CE) routers 810 may be interconnected with provider edge (PE) routers 820 (e.g., PE-1, PE-2, and PE-3) in order to communicate across a core network, such as an illustrative network as backbone 830. For example, routers 810, 820 may be interconnected by the public Internet, a multiprotocol label switching (MPLS) virtual private network (VPN), or the like. Data packets 840 (e.g., traffic/messages) may be exchanged among the nodes/devices of the computer network 800 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 810 shown in network 800 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected is to network 800 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2, or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 810 connected to PE-2 and a second CE router 810 connected to PE-3.

Figure 9:
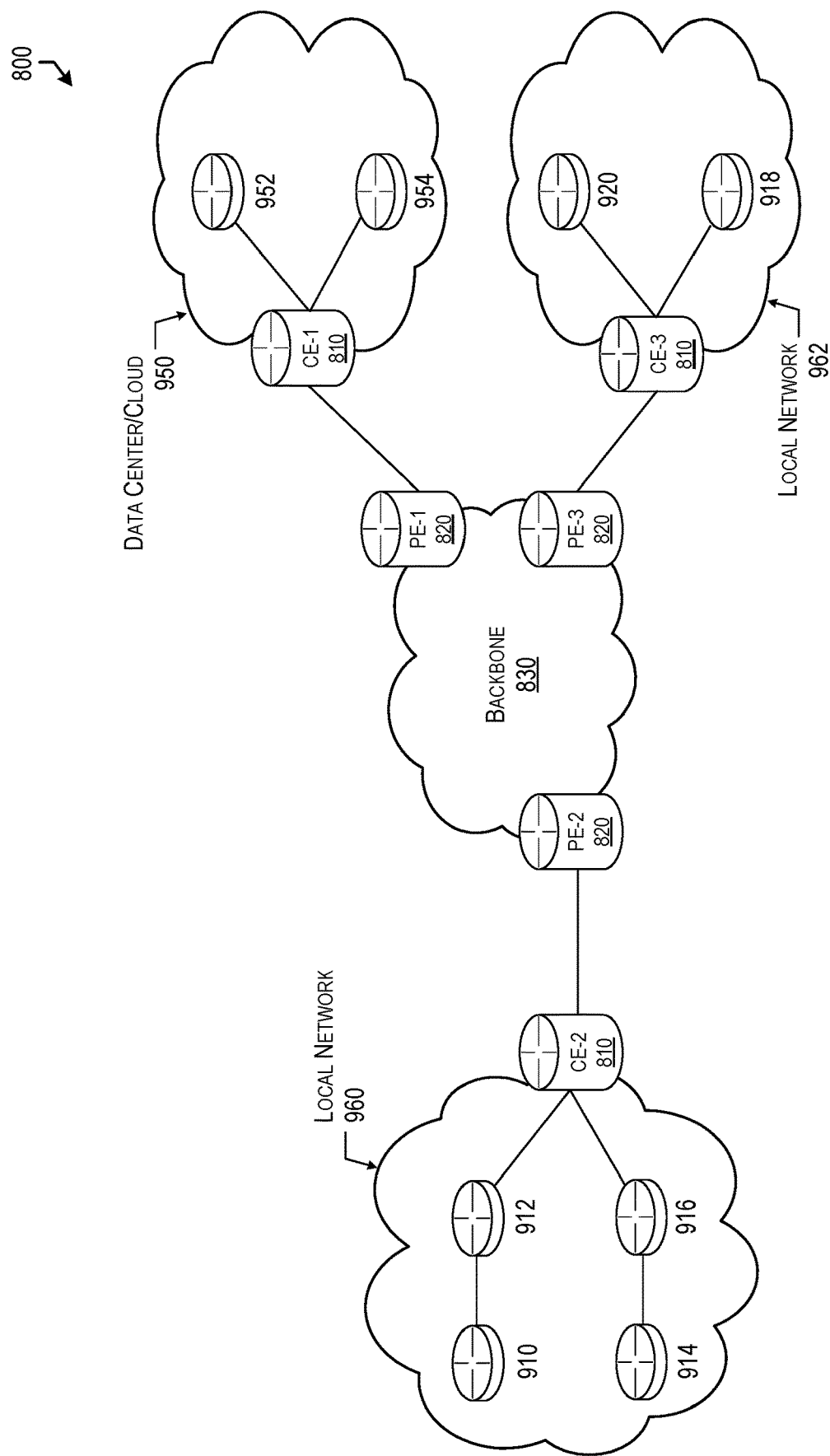
FIG. 9 illustrates an example of network in greater detail, according to various embodiments.

FIG. 9 illustrates an example of network 800 in greater detail, according to various embodiments. As shown, network backbone 830 may provide connectivity between devices located in different geographical areas and/or different types of local networks. For example, network 800 may comprise local/branch networks 960, 962 that include devices/nodes 910-916 and devices/nodes 918-920, respectively, as well as a data center/cloud environment 950 that includes servers 952-954. Notably, local networks 960-962 and data center/cloud environment 950 may be located in different geographic locations.

Servers 952-954 may include, in various embodiments, a network management server (NMS), a dynamic host configuration protocol (DHCP) server, a constrained application protocol (COAP) server, an outage management system (OMS), an application policy infrastructure controller (APIC), an application server, etc. As would be appreciated, network 800 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software defined WAN (SD-WAN) may be used in network 800 to connect local network 960, local network 962, and data center/cloud 950. In general, an SD-WAN uses a software defined networking (SDN)-based approach to instantiate tunnels on top of the physical network and control routing decisions, accordingly. For example, as noted above, one tunnel may connect router CE-2 at the edge of local network 960 to router CE-1 at the edge of data center/cloud 950 over an MPLS or Internet-based service provider network in backbone 830. Similarly, a second tunnel may also connect these routers over a 4G/5G/LTE cellular service provider network. SD-WAN techniques allow the WAN functions to be virtualized, essentially forming a virtual connection between local network 960 and data center/cloud 950 on top of the various underlying connections. Another feature of SD-WAN is centralized management by a supervisory service that can monitor and adjust the various connections, as needed.

Figure 10:
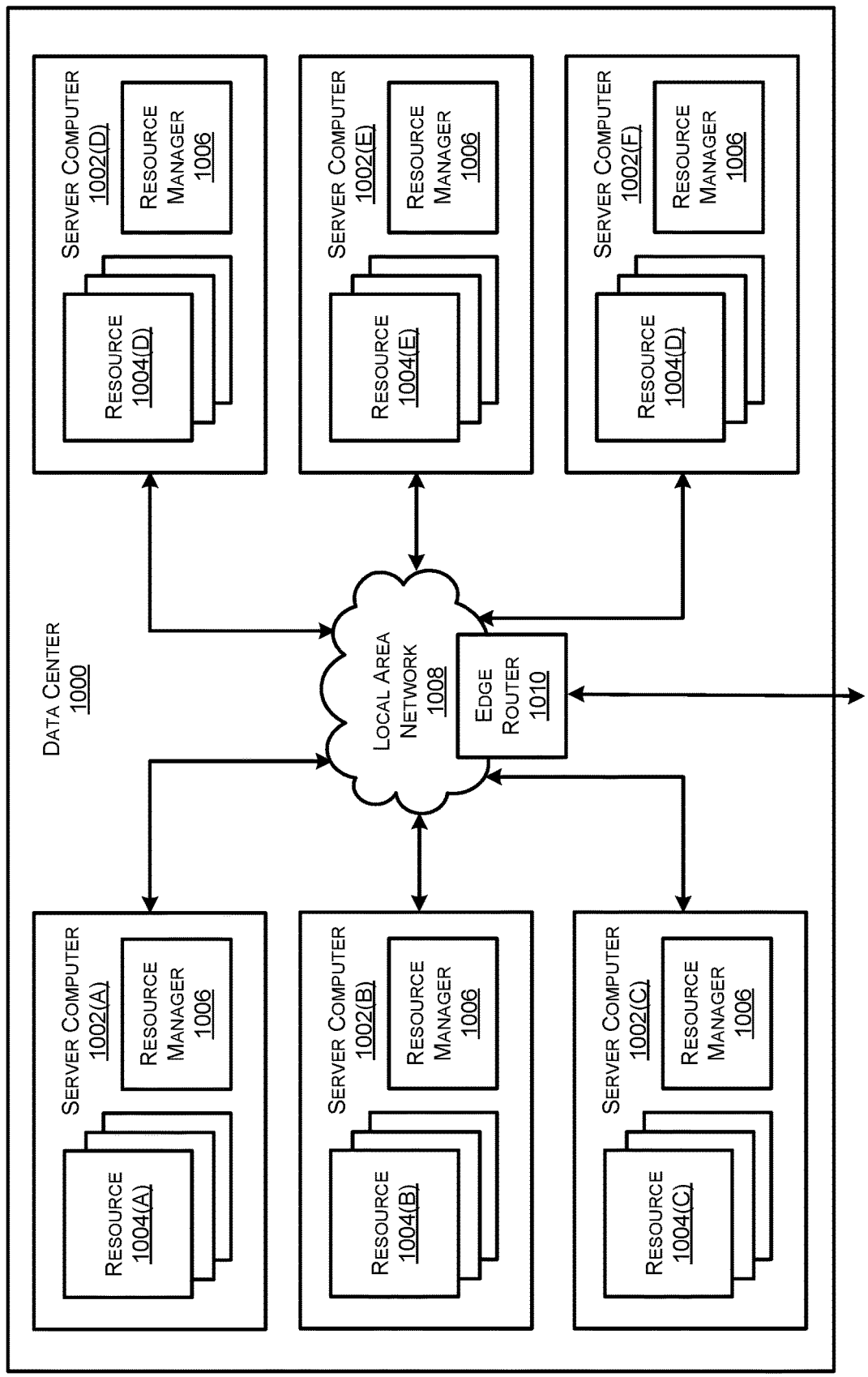
FIG. 10 is a computing system diagram illustrating a configuration for a data center that can be utilized to implement aspects of the technologies disclosed herein

FIG. 10 is a computing system diagram illustrating a configuration for a data center 1000 that can be utilized to implement aspects of the technologies disclosed herein. The example data center 1000 shown in FIG. 10 includes several server computers 1002A-1002F (which might be referred to herein singularly as "a server computer 1002" or in the plural as "the server computers 1002") for providing computing resources. In some examples, the resources and/or server computers 1002 may include, or correspond to, the any type of networked device described herein. Although described as servers, the server computers 1002 may comprise any type of networked device, such as servers, switches, routers, hubs, bridges, gateways, modems, repeaters, access points, etc.

The server computers 1002 can be standard tower, rackmount, or blade server computers configured appropriately for providing computing resources. In some examples, the server computers 1002 may provide computing resources 1004 including data processing resources such as VM instances or hardware computing systems, database clusters, computing clusters, storage clusters, data storage resources, database resources, networking resources, and others. Some of the servers 1002 can also be configured to execute a resource manager 1006 capable of instantiating and/or managing the computing resources. In the case of VM instances, for example, the resource manager 1006 can be a hypervisor or another type of program configured to enable the execution of multiple VM instances on a single server computer 1002. Server computers 1002 in the data center 1000 can also be configured to provide network services and other types of services.

In the example data center 1000 shown in FIG. 10, an appropriate LAN 1008 is also utilized to interconnect the server computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1000, between each of the server computers 1002A-1002F in each data center 1000, and, potentially, between computing resources in each of the server computers 1002. It should be appreciated that the configuration of the data center 1000 described with reference to FIG. 10 is merely illustrative and that other implementations can be utilized.

In some examples, the server computers 1002 may each execute one or more application containers and/or virtual machines to perform techniques described herein.

In some instances, the data center 1000 may provide computing resources, like application containers, VM instances, and storage, on a permanent or an as-needed basis. Among other types of functionality, the computing resources provided by a cloud computing network may be utilized to implement the various services and techniques described above. The computing resources 1004 provided by the cloud computing network can include various types of computing resources, such as data processing resources like application containers and VM instances, data storage resources, networking resources, data communication resources, network services, and the like.

Each type of computing resource 1004 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 1004 not mentioned specifically herein.

The computing resources 1004 provided by a cloud computing network may be enabled in one embodiment by one or more data centers 1000 (which might be referred to herein singularly as "a data center 1000" or in the plural as "the data centers 1000"). The data centers 1000 are facilities utilized to house and operate computer systems and associated components. The data centers 1000 typically include redundant and backup power, communications, cooling, and security systems. The data centers 1000 can also be located in geographically disparate locations. One illustrative embodiment for a data center 1000 that can be utilized to implement the technologies disclosed herein will be described below with regard to FIG. 11.

The LAN 1008 may be configured to enable connectivity between the server computers 1002(A-F) and an external wide area network (WAN). In some embodiments, this is accomplished via an edge router 1010 in communication with the LAN 1008. Such an edge router 1010 may use any suitable routing protocols to route communications between the various components depicted.

Figure 11:
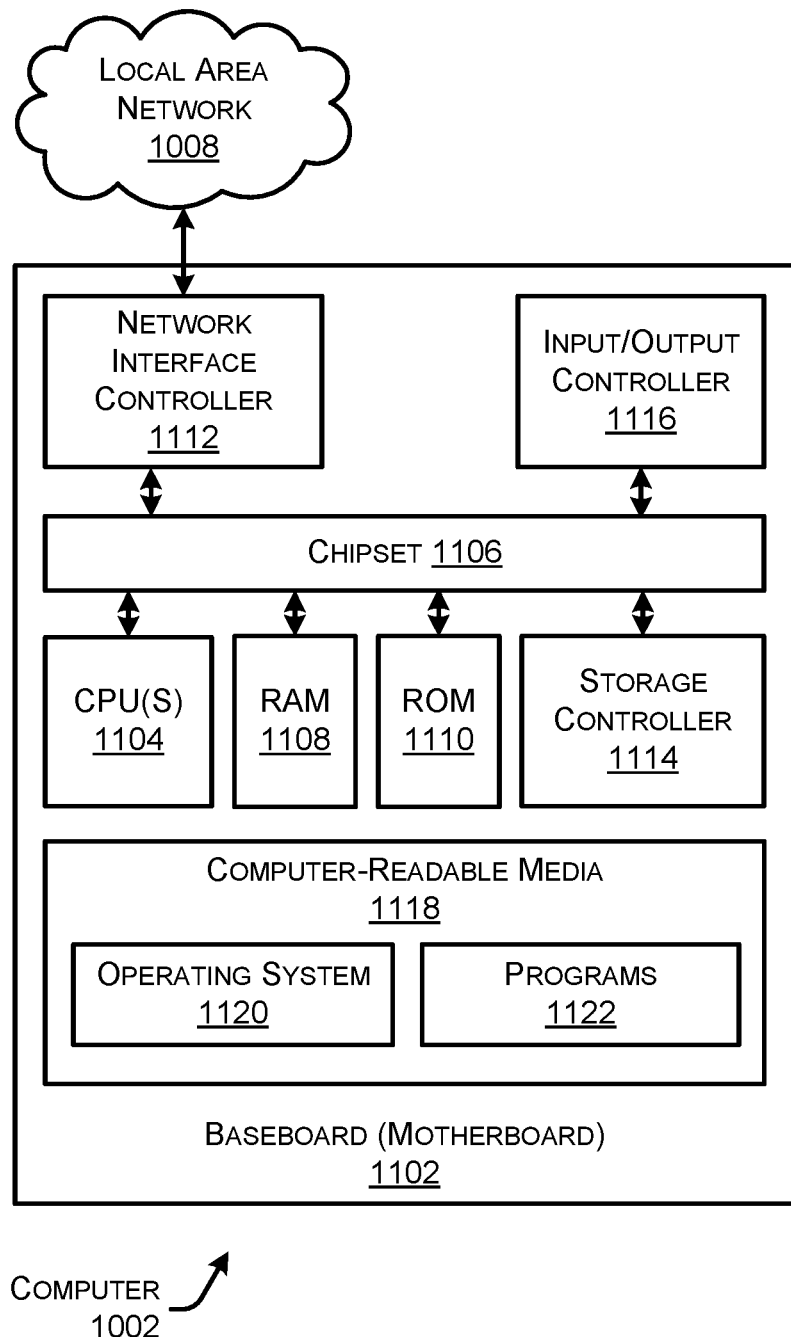
FIG. 11 shows an example computer architecture for a server computer capable of executing program components for implementing the functionality described above.

FIG. 11 shows an example computer architecture for a server computer 1002 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. The server computer 1002 may, in some examples, correspond to a physical server as described herein, and may comprise networked devices such as servers, switches, routers, hubs, bridges, gateways, modems, repeaters, access points, etc.

The computer 1002 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1002.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1002. The chipset 1106 can further provide an interface to a computer-readable storage medium such as a read-only memory ("ROM") 1110 or non-volatile RAM ("NVRAM") for storing basic routines that help to startup the computer 1002 and to transfer information between the various components and devices. The ROM 1110 or NVRAM can also store other software components necessary for the operation of the computer 1002 in accordance with the configurations described herein.

The computer 1002 can operate in a networked environment using logical connections to remote computing devices and computer systems through a network, such as the network 1008. The chipset 1106 can include functionality for providing network connectivity through a NIC 1112, such as a gigabit Ethernet adapter. The NIC 1112 is capable of connecting the computer 1002 to other computing devices over the network 1008 (and/or 102). It should be appreciated that multiple NICs 812 can be present in the computer 1002, connecting the computer to other types of networks and remote computer systems.

The computer 1002 can be connected to a storage device 1118 that provides non-volatile storage for the computer. The storage device 1118 can store an operating system 1120, programs 1122, and data, which have been described in greater detail herein. The storage device 1118 can be connected to the computer 1002 through a storage controller 1114 connected to the chipset 1106. The storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1002 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like.

For example, the computer 1002 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1002 can further read information from the storage device 1118 by detecting the physical states or characteristics of one or more particular locations within the physical storage units.

In addition to the mass storage device 1118 described above, the computer 1002 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1002. In some examples, the operations performed by devices as described herein may be supported by one or more devices similar to computer 1002. Stated otherwise, some or all of the operations performed by the edge device 106, and/or any components included therein, may be performed by one or more computer devices 1002 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1118 can store an operating system 1120 utilized to control the operation of the computer 1002. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1118 can store other system or application programs and data utilized by the computer 1002.

In one embodiment, the storage device 1118 or other computer-readable storage media is encoded with computer-executable instructions which, when loaded into the computer 1002, transform the computer from a general-purpose computing system into a special-purpose computer capable of implementing the embodiments described herein. These computer-executable instructions transform the computer 1002 by specifying how the CPUs 1104 transition between states, as described above. According to one embodiment, the computer 1002 has access to computer-readable storage media storing computer-executable instructions which, when executed by the computer 1002, perform the various processes described above with regard to FIGS. 1-7. The computer 1002 can also include computer-readable storage media having instructions stored thereupon for performing any of the other computer-implemented operations described herein.

The computer 1002 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computer 1002 might not include all of the components shown in FIG. 11, can include other components that are not explicitly shown in FIG. 8, or might utilize an architecture completely different than that shown in FIG. 11.

As described herein, the computer 1002 may include one or more hardware processors 1104 (processors) configured to execute one or more stored instructions. The processor(s) 1104 may comprise one or more cores. Further, the computer 1002 may include one or more network interfaces configured to provide communications between the computer 1002 and other devices, such as the communications described herein as being performed by the edge device 106. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 800. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 1122 may comprise any type of programs or processes to perform the techniques described in this disclosure. The programs 1122 may comprise any type of program that cause the computer 1002 to perform techniques for communicating with other devices using any type of protocol or standard usable for determining connectivity. These software processors and/or services may comprise a routing module and/or a Path Evaluation (PE) Module, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing, e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below, PE Module may also include computer executable instructions that, when executed by processor(s), cause computing device 1002 to perform the techniques described herein. To do so, in some embodiments, PE Module may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, PE Module may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANS (SD-WANs), traffic between individual sites is sent over tunnels. The tunnels are configured to use different switching fabrics, such as MPLS, Internet, 4G or 5G, etc. Often, the different switching fabrics provide different quality of service (QoS) at varied costs. For example, an MPLS fabric typically provides high QoS when compared to the Internet but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfied, based on the switching fabric that it uses. During runtime, the SD-WAN edge router then maps the application traffic to an appropriate tunnel.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    determining, at an edge device using one or more network probes, current metrics for a set of potential paths between the edge device and an application endpoint associated with an application;
    generating, at the edge device from the current metrics, a link score for individual paths in the set of potential paths;
    receiving, at the edge device, application status data generated from historic telemetry data associated with the application and the set of potential paths, the application status data generated by a remote device configured to monitor application usage at the application endpoint;
    generating, at the edge device from the application status data, an application score for individual paths in the set of potential paths;
    determining, at the edge device, a confidence value associated with the application status data as a function of a stability of the application and an age of the received application status data, wherein the stability of the application comprises a value that is inverse to a rate of change in the status of the application and wherein the function outputs a higher confidence value with a lower age of the received application status data; and
    determining, at the edge device, a selected path to be used in communications between the edge device and the application endpoint based on:
        generating a ranking value for individual paths in the set of potential paths based on a combination of the link score generated at the edge device for the respective individual path and the application score for the respective individual path generated from the application status data received from the remote system, wherein the combination is generated using a function in which the application score is given a weight based on the confidence value; and
        identifying the selected path based on having the highest-ranking value.

2. The method of claim 1, further comprising:
    receiving, at the edge device from a user device, a request to access the application; and
    routing the request over the selected path.

3. The method of claim 1, wherein the set of potential paths comprise at least one of a set of tunnels or direct internet breakout links across networks that make up a software-defined wide area network (SD-WAN) fabric.

4. The method of claim 1, wherein the application is hosted on a Software as a Service (SaaS) provider platform.

5. The method of claim 1, wherein determining current metrics for a set of potential paths comprises:
    sending the one or more network probes through the set of potential paths; and
    collecting the current metrics from the one or more network probes.

6. The method of claim 1, wherein the current metrics comprise at least one of a loss, latency, or jitter for individual paths in the set of potential paths.

7. An edge device acting as a router for a client device, the edge device comprising:
    one or more processors; and
    one or more non-transitory computer-readable media storing computer-executable instructions that, when executed by the one or more processors, cause the edge device to perform operations comprising:
        determining, by the edge device using one or more network probes, current metrics for a set of potential paths associated with an application endpoint associated with an application;
        generating, based on the current metrics, a link score for individual paths in the set of potential paths associated with the application endpoint associated with the application;
        receiving application status data generated from historic telemetry data associated with the application and the set of potential paths at an application endpoint;
        generating an application score for individual paths in the set of potential paths based on the application status data;
        determining a confidence value associated with the application score as a function of a stability of the application and an age of the historic telemetry data, wherein the stability of the application comprises a value that is inverse to a rate of change in the status of the application and wherein the function outputs a higher confidence value with a lower age of the received application status data; and
        determining, based on a combination of the link score and the application score for individual paths in the set of potential paths, a selected path to be used in communications between the edge device and the application endpoint, wherein the combination is generated having a weight of the application score based on the confidence value.

8. The edge device of claim 7, wherein the edge device acts as a gateway between a local area network and a software-defined wide area network (SD-WAN) fabric.

9. The edge device of claim 7, wherein the historic telemetry data is provided by a software as a service (SaaS) platform hosting the application.

10. The edge device of claim 7, wherein the link score comprises a numeric representation of a current network status.

11. The edge device of claim 7, wherein the application score comprises a numeric representation of a historic status of a path with respect to routing of application data associated with the application.

12. The edge device of claim 7, wherein determining the selected path comprises:
calculating a ranking for individual paths in the set of potential paths as a function of the link score and the application score; and
selecting the selected path as the individual path of the set of potential paths having the highest ranking.

13. The edge device of claim 12, wherein the confidence value comprises a ratio and the ranking for individual paths in the set of potential paths is further calculated as a function of the application score as weighted based on the confidence value.

14. The edge device of claim 13, wherein the confidence value represents a degree of likelihood that the application score is likely to persist.

15. One or more non-transitory computer-readable media storing computer-executable instructions that, when executed by one or more processors, cause the one or more processors to perform operations comprising:
generating, based on current metrics obtained using network probes, a link score for individual paths in a set of potential paths associated with an application endpoint associated with an application;
receiving application status data generated from historic telemetry data associated with the application and the set of potential paths at an application endpoint;
generating an application score for individual paths in the set of potential paths based on the application status data;
determining a confidence value associated with the application score as a function of a stability of the application and an age of the historic telemetry data, wherein the stability of the application comprises a value that is inverse to a rate of change in the status of the application and wherein the function outputs a higher confidence value with a lower age of the received application status data; and
determining, based on a combination of the link score and the application score for individual paths in the set of potential paths, a selected path to be used in communications between the edge device and the application endpoint, wherein the combination is generated using a function that assigns a weight to the application score based on the confidence value.

16. The one or more non-transitory computer-readable media of claim 15, the operations further comprising:
calculating a ranking for individual paths in the set of potential paths as a function of the link score and the application score; and
selecting the selected path as the individual path of the set of potential paths having the highest ranking.

17. The one or more non-transitory computer-readable media of claim 16, wherein the confidence value comprises a ratio and the ranking for individual paths in the set of potential paths is further calculated as a function of the application score as weighted based on the confidence value.

18. The one or more non-transitory computer-readable media of claim 17, wherein the application score comprises a numeric representation of a historic status of a path with respect to routing of application data associated with the application.

19. The one or more non-transitory computer-readable media of claim 17, wherein the application score is generated based on information received from an analytics service configured to monitor usage of the application on an application platform.

* * * * *